United States Patent
Hirka et al.

(10) Patent No.: US 8,015,084 B1
(45) Date of Patent: Sep. 6, 2011

(54) SYSTEM AND METHOD FOR LINKED ACCOUNT HAVING SWEEP FEATURE

(75) Inventors: Jeffrey L. Hirka, Wilmington, DE (US); Steven J. Fox, Newark, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 3457 days.

(21) Appl. No.: 09/655,886

(22) Filed: Sep. 6, 2000

(51) Int. Cl.
 *G06Q 40/00* (2006.01)

(52) U.S. Cl. .......................................... 705/35; 705/40

(58) Field of Classification Search .................. 705/30, 705/33, 35, 36, 38, 39, 40, 41, 42, 43, 45
See application file for complete search history.

(56) References Cited

U.S. PATENT DOCUMENTS

| | | |
|---|---|---|
| 3,653,480 A | 4/1972 | Yamamoto |
| 4,321,672 A | 3/1982 | Braun |
| 4,396,985 A | 8/1983 | Ohara |
| 4,617,457 A | 10/1986 | Granzow |
| 4,634,845 A | 1/1987 | Hale et al. .................... 235/350 |
| 4,672,377 A | 6/1987 | Murphy |
| 4,700,055 A | 10/1987 | Kashkashian, Jr. ............ 235/379 |
| 4,750,119 A | 6/1988 | Cohen et al. .................. 364/401 |
| 4,766,293 A | 8/1988 | Boston .......................... 235/379 |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,831,242 A | 5/1989 | Englehardt et al. ........... 235/382 |
| 4,882,675 A | 11/1989 | Nichtberger et al. ......... 364/401 |
| 4,906,826 A | 3/1990 | Spencer ....................... 235/379 |
| 4,953,085 A | 8/1990 | Atkins |
| 4,988,849 A | 1/1991 | Sasaki |
| 5,023,904 A | 6/1991 | Kaplan |
| 5,025,372 A | 6/1991 | Burton et al. ................. 364/406 |
| 5,053,607 A | 10/1991 | Carlson |
| 5,054,096 A | 10/1991 | Beizer |

(Continued)

FOREIGN PATENT DOCUMENTS

| WO | WO 91/16691 | 10/1991 |
|---|---|---|

(Continued)

OTHER PUBLICATIONS

"Here's the call convenience you asked for 1-800-call-ATT . . . For All Calls," AT&T Universal Platinum Master Card and Calling Card publication, 1998, pp. 1-7, author unknown.

(Continued)

*Primary Examiner* — Charles Kyle
*Assistant Examiner* — Siegfried E. Chencinski
(74) *Attorney, Agent, or Firm* — Goodwin Procter LLP (57) ABSTRACT

A linked account instrument is used to access funds in an existing demand deposit account held at a financial institution. Merchant or other transactions are first processed against a demand deposit account via an electronic authorization network. If the demand deposit account does not have sufficient funds, the transactions may be processed as a credit charge against a designated credit account. The demand deposit account may subsequently be swept at predetermined times in search of funds to defray the overdraft. If adequate funds are present, they will be withdrawn from the demand deposit account, and the credit account will be cleared. Otherwise, the instrument holder's daily purchasing abilities may be temporarily suspended until the credit account is settled. The processing of overdraft amounts may be on a FIFO, smallest-first or other basis.

25 Claims, 7 Drawing Sheets

U.S. PATENT DOCUMENTS

| | | | |
|---|---|---|---|
| 5,111,395 A | 5/1992 | Smith | |
| 5,117,355 A | 5/1992 | McCarthy | 364/405 |
| 5,122,950 A | 6/1992 | Benton | |
| 5,175,416 A | 12/1992 | Mansvelt et al. | 235/379 |
| 5,175,682 A | 12/1992 | Higashiyama | |
| 5,192,947 A | 3/1993 | Neustein | 340/825.44 |
| 5,198,975 A | 3/1993 | Baker | |
| 5,202,826 A | 4/1993 | McCarthy | 364/405 |
| 5,225,978 A | 7/1993 | Peterson | |
| 5,237,159 A | 8/1993 | Stephens et al. | |
| 5,237,620 A | 8/1993 | Deaton et al. | |
| 5,276,311 A | 1/1994 | Hennige | 235/380 |
| 5,283,829 A | 2/1994 | Anderson | |
| 5,287,268 A | 2/1994 | McCarthy | 364/405 |
| 5,287,269 A | 2/1994 | Dorrough et al. | 364/408 |
| 5,297,026 A | 3/1994 | Hoffman | 364/408 |
| 5,311,594 A | 5/1994 | Penzias | 380/23 |
| 5,321,238 A | 6/1994 | Kamata | |
| 5,326,959 A | 7/1994 | Perazza | |
| 5,326,960 A | 7/1994 | Tannenbaum | 235/379 |
| 5,336,870 A | 8/1994 | Hughes | |
| 5,339,239 A | 8/1994 | Manabe et al. | 364/401 |
| 5,350,906 A | 9/1994 | Brody et al. | 235/379 |
| 5,367,581 A | 11/1994 | Abel | |
| 5,373,550 A | 12/1994 | Campbell | |
| 5,396,417 A | 3/1995 | Burks | |
| 5,397,881 A | 3/1995 | Mannik | 235/380 |
| 5,402,474 A | 3/1995 | Miller | |
| RE34,915 E | 4/1995 | Nichtberger et al. | 364/401 |
| 5,412,190 A | 5/1995 | Kopesec | |
| 5,420,405 A | 5/1995 | Chasek | |
| 5,424,524 A | 6/1995 | Ruppert et al. | 235/462 |
| 5,424,938 A | 6/1995 | Wagner | |
| 5,430,644 A | 7/1995 | Deaton et al. | |
| 5,444,794 A | 8/1995 | Uhland | |
| 5,444,841 A | 8/1995 | Glaser | |
| 5,446,740 A | 8/1995 | Stratiagos | |
| 5,448,471 A | 9/1995 | Deaton | |
| 5,450,477 A | 9/1995 | Amarant et al. | 379/93 |
| 5,465,206 A | 11/1995 | Hilt et al. | 364/406 |
| 5,471,669 A | 11/1995 | Lidman | 235/383 |
| 5,477,038 A | 12/1995 | Levine et al. | 235/380 |
| 5,479,494 A | 12/1995 | Clitherow | 379/144 |
| 5,479,532 A | 12/1995 | Abel | |
| 5,482,139 A | 1/1996 | Rivalto | 186/36 |
| 5,483,445 A | 1/1996 | Pickering | |
| 5,484,988 A | 1/1996 | Hills | |
| 5,500,514 A | 3/1996 | Veeneman et al. | 235/381 |
| 5,504,677 A | 4/1996 | Pollin | |
| 5,506,691 A | 4/1996 | Bednar | |
| 5,511,114 A | 4/1996 | Stimson et al. | 379/114 |
| 5,513,250 A | 4/1996 | McAllister | |
| 5,521,363 A | 5/1996 | Tannenbaum | 235/379 |
| 5,530,232 A | 6/1996 | Taylor | 235/380 |
| 5,530,235 A | 6/1996 | Stefik et al. | 235/492 |
| 5,537,314 A | 7/1996 | Kanter | 364/406 |
| 5,544,040 A | 8/1996 | Gerbaulet | |
| 5,544,086 A | 8/1996 | Davis et al. | 364/408 |
| 5,544,246 A | 8/1996 | Mandelbaum et al. | 380/23 |
| 5,550,734 A | 8/1996 | Tarter | |
| 5,551,021 A | 8/1996 | Harada et al. | |
| 5,566,330 A | 10/1996 | Sheffield | |
| 5,568,489 A | 10/1996 | Yien | |
| 5,577,109 A | 11/1996 | Stimson et al. | 379/112 |
| 5,578,808 A | 11/1996 | Taylor | 235/380 |
| 5,583,759 A | 12/1996 | Geer | |
| 5,585,787 A | 12/1996 | Wallerstein | 340/825.34 |
| 5,590,038 A | 12/1996 | Pitroda | 395/241 |
| 5,590,196 A | 12/1996 | Moreau | |
| 5,592,377 A | 1/1997 | Lipkin | |
| 5,592,378 A | 1/1997 | Cameron | |
| 5,608,785 A | 3/1997 | Kasday | 379/90 |
| 5,621,201 A | 4/1997 | Langhans | |
| 5,621,787 A | 4/1997 | McKoy et al. | 379/144 |
| 5,637,845 A | 6/1997 | Kolls | 235/381 |
| 5,640,577 A | 6/1997 | Scharmer | |
| 5,644,727 A * | 7/1997 | Atkins | 705/40 |
| 5,649,117 A | 7/1997 | Landry | |
| 5,649,118 A | 7/1997 | Carlisle et al. | 395/241 |
| 5,652,786 A | 7/1997 | Rogers | |
| 5,659,165 A | 8/1997 | Jennings | |
| 5,659,469 A | 8/1997 | Deaton | |
| 5,664,110 A | 9/1997 | Green et al. | 705/26 |
| 5,675,607 A | 10/1997 | Alesio et al. | 379/114 |
| 5,677,955 A | 10/1997 | Doggett et al. | 380/24 |
| 5,679,938 A | 10/1997 | Templeton | |
| 5,679,940 A | 10/1997 | Templeton | |
| 5,689,100 A | 11/1997 | Carrithers et al. | 235/380 |
| 5,692,132 A | 11/1997 | Hogan | |
| 5,699,528 A | 12/1997 | Hogan | |
| 5,703,344 A | 12/1997 | Bezy et al. | 235/379 |
| 5,708,422 A | 1/1998 | Blonder et al. | 340/825.34 |
| 5,710,886 A | 1/1998 | Christensen et al. | 395/214 |
| 5,710,889 A | 1/1998 | Clark | |
| 5,715,298 A | 2/1998 | Rogers | |
| 5,715,314 A | 2/1998 | Payne | |
| 5,715,399 A | 2/1998 | Bezos | 395/227 |
| 5,721,768 A | 2/1998 | Stimson et al. | 379/114 |
| 5,724,424 A | 3/1998 | Gifford | |
| 5,727,153 A | 3/1998 | Powell | 395/214 |
| 5,727,249 A | 3/1998 | Powell | |
| 5,751,842 A | 5/1998 | Riach | |
| 5,760,381 A | 6/1998 | Stich et al. | 235/380 |
| 5,765,141 A | 6/1998 | Spector | 705/14 |
| 5,770,843 A | 6/1998 | Rose et al. | 235/380 |
| 5,777,305 A | 7/1998 | Smith et al. | 235/380 |
| 5,777,306 A | 7/1998 | Masuda | 235/380 |
| 5,787,404 A | 7/1998 | Fernandez-Holmann | 705/35 |
| 5,793,861 A | 8/1998 | Haigh | |
| 5,794,221 A | 8/1998 | Egendorf | |
| 5,802,498 A | 9/1998 | Comesanas | |
| 5,819,236 A | 10/1998 | Josephson | |
| 5,823,463 A | 10/1998 | Fissmann | |
| 5,826,241 A | 10/1998 | Stein et al. | |
| 5,826,245 A | 10/1998 | Sandberg-Diment | |
| 5,832,447 A | 11/1998 | Rieker | |
| 5,832,460 A | 11/1998 | Bednar | |
| 5,832,464 A | 11/1998 | Houvener | |
| 5,835,603 A | 11/1998 | Coutts | |
| 5,845,259 A | 12/1998 | West et al. | 705/14 |
| 5,852,811 A | 12/1998 | Atkins | |
| 5,852,812 A | 12/1998 | Reeder | |
| 5,857,079 A | 1/1999 | Claus et al. | 704/33 |
| 5,859,419 A | 1/1999 | Wynn | 235/487 |
| 5,864,609 A | 1/1999 | Cross et al. | 379/115 |
| 5,864,828 A | 1/1999 | Atkins | |
| 5,864,830 A | 1/1999 | Armetta et al. | 705/41 |
| 5,870,456 A | 2/1999 | Rogers | |
| 5,870,718 A | 2/1999 | Spector | 705/26 |
| 5,870,721 A | 2/1999 | Norris | 705/38 |
| 5,870,725 A | 2/1999 | Belinger | |
| 5,873,072 A | 2/1999 | Kight | |
| 5,875,437 A | 2/1999 | Atkins | |
| 5,883,810 A | 3/1999 | Franklin et al. | 364/479.02 |
| 5,884,285 A | 3/1999 | Atkins | |
| 5,884,288 A | 3/1999 | Chang | |
| 5,897,625 A | 4/1999 | Gustin | |
| 5,903,881 A | 5/1999 | Schrader | |
| 5,910,988 A | 6/1999 | Ballard | |
| 5,911,135 A | 6/1999 | Atkins | |
| 5,911,136 A | 6/1999 | Atkins | |
| 5,920,847 A | 7/1999 | Kolling | |
| 5,926,800 A | 7/1999 | Baronowski et al. | 705/35 |
| 5,930,217 A | 7/1999 | Kayanuma | 369/59 |
| 5,930,778 A | 7/1999 | Geer | |
| 5,940,811 A | 8/1999 | Norris | 705/38 |
| 5,940,844 A | 8/1999 | Cahill | |
| 5,943,656 A | 8/1999 | Crooks | |
| 5,945,653 A | 8/1999 | Walker | |
| 5,955,961 A | 9/1999 | Wallerstein | 340/825.33 |
| 5,966,698 A | 10/1999 | Pollin | |
| 5,978,780 A | 11/1999 | Watson | |
| 5,991,750 A | 11/1999 | Watson | 705/44 |
| 6,003,762 A | 12/1999 | Hayashida | |
| 6,006,208 A | 12/1999 | Forst | |
| 6,014,645 A | 1/2000 | Cunningham | 705/38 |
| 6,016,954 A | 1/2000 | Abe et al. | 235/379 |

| | | | |
|---|---|---|---|
| 6,032,137 | A | 2/2000 | Ballard |
| 6,038,552 | A | 3/2000 | Fleischl et al. ............... 705/44 |
| 6,038,553 | A | 3/2000 | Hyde |
| 6,041,315 | A | 3/2000 | Pollin |
| 6,065,675 | A | 5/2000 | Teicher |
| 6,105,011 | A | 8/2000 | Morrison |
| 6,111,858 | A | 8/2000 | Greaves |
| 6,129,273 | A | 10/2000 | Shah |
| 6,149,056 | A | 11/2000 | Stinson |
| 6,226,623 | B1 * | 5/2001 | Schein et al. ............... 705/35 |
| 6,338,049 | B1 | 1/2002 | Walker et al. |
| 7,392,224 | B1 | 6/2008 | Bauer et al. |
| 2001/0018739 | A1 | 8/2001 | Anderson et al. |
| 2001/0037309 | A1 | 11/2001 | Vrain |

FOREIGN PATENT DOCUMENTS

| | | |
|---|---|---|
| WO | WO 93/08545 | 4/1993 |
| WO | WO 96/08783 | 3/1996 |

OTHER PUBLICATIONS

"Amex prepaid offering is latest card for firms rewarding employees," American Express Co. employees incentive funds card product announcement, Feb. 9, 1999, DIALOG(R) File 148: Trade & Industry Database, Lisa Fickenscher, American Banker, v161, n151, p11(1) Aug. 8, 1996, pp. 1-2.

"Associates First Capital Corporation," The Industry Standard Company Capsules website, Hoover's Company Capsule, Apr. 6, 1999, pp. 1-2.

"Boatmen's Floats Stored Value Into the Employee Incentive Waters," Debit Card News, vol. 2, Issue 2, Jul. 16, 1996, puglished by Faulkner & Gray, Inc., pp. 1-3.

"Boatmen's Prepaid Cards for Worker-Incentive Firm," by Mickey Meece, DIALOG(R) File 16:PrROMT(R), The Gale Group, Jul. 2, 1996, 1 page.

"CardEx Incentives," website http://www.cardex.com/about.htm, Apr. 6, 1999, 14 pages.

"Cards on the Internet—Advertising on a $3 Bill," Industry Intelligence, by Gerry Vandenengel, no date available, pp. 46-48.

"Cash, check, charge—what's next?," published on Mar. 6, 1995 in the Seattle Times, by David Bank, 4 pages.

"Cash just isn't flexible enough : Shops of the future will only take cards," Technology Express Section of the Daily Express, Feb. 10, 1995 by Nick Rosen, 1 page.

"Debit Cards Seen Poised for New Markets," published in the American Banker on Mar. 7, 1995, by Beth Piskora, 1 page.

"D.C. Area Safeway Stores Look for Increase In Sales volume and Revenue With Cards," Card News Phillips Publishing, Inc., vol. 6, No. 25 ISSN: 0894-0797, Dec. 30, 1991, 3 pages.

"Incentives Field Moving to Card-Based Awards Series: 14," American Banker, by Antoinette Coulton, Mar. 26, 1998, 3 pages.

"Electronic Payments and Internet commerce," H.W. Wilson Co., Record No. BWBA97056650 (The evolution of a new consumerism), Chain Store Age (Chain Store Age) v. 73 (Jun. 1997 supp), 3 pages.

"First USA Platinum Connect," Calling card application offered by First USA, 6 pages.

"Introducing the First USA Platinum Connect card," offered by First USA, 6 pages.

"The Gift of Credit," by Stephanie Stoughton, date unavailable, 1 page.

"Incentive Firms Find Debit Cards a Rewarding Experience," Debit Card News, vol. 3, No. 11, Nov. 28, 1997, 3 pages.

"Stuck for a gift? Give a prepaid Credit Card," bankrate.com website by Lucy Lazarony of bankrate.com—posted Dec. 21, 1998, 4 pages.

"Universal Card free lifetime membership extended 3 months," News Release dated Dec. 4, 1990, AT&T, 4 pages.

"Microsoft, Visa to Jointly Develop PC Electronic-Shopping Software," by Don Clark staff reporter of the Wall Street Journal, Nov. 9, 1994, 3 pages.

"Introducing Spending Money," A new card product concept presented to First USA, Oct. 9, 1996, Armetta Marketing & Design, 15 pages.

"More retailers turn to co-branding (store credit cards linked to bank)," Chain Store Age Executive with Shopping Center Age, vol. 71, No. 2, ISSN: 0193-1199, Feb. 1, 1995, 3 pages.

"Welcome to Swift Gift," website, http:www.swiftgiftcard.com, Dec. 8, 1998, 11 pages.

"Sopininmon! or what's happening in the retail credit card environment?," Credit World, vol. 85, No. 4, Mar. 1, 1997, by Ralph E. Spurgin, pp. 1-7.

"A Store Card Issuer Looks for Lift from Electronic Gift Certificates," Credit Card News, p. 4, Feb. 1, 1995, published by Faulker & Gray, 2 pages.

"Stored value cards: costly private substitutes for government currency," Economic Quarterly, vol. 82, No. 3, pl(25), Summer 1996, by Jeffrey M. Lacker, 17 pages.

"The SwiftGift," KeyBank Holiday Offer, Apr. 5, 1999, 12 pages.

"Maritz Gets Mastercard's Stamp of Approval: Has signed a marketing deal with MasterCard," Business Travel News, Aug. 19, 1996, by Stefani O'Connor, 2 pages.

"New 1-800-CALL-ATT campaign promotes one number for all calls," AT&T News Release on AT&T website http://www.att.com/press/0297/970217.csa.html, Jun. 13, 2000, pp. 1-2.

Visa & Carnegie Mellon Plan Online Payment Scheme, Newsbyte News Network, Feb. 15, 1995.

* cited by examiner

SYSTEM AND METHOD FOR LINKED ACCOUNT HAVING SWEEP FEATURE

FIELD OF THE INVENTION

The invention relates generally to electronic commerce, and more particularly to a linked account that allows cardholders to apply funds in a cash demand deposit account or other account to transactions with a credit card, in a manner which allows these transactions to be automatically reconciled against the cash account on a daily or other basis.

BACKGROUND OF THE INVENTION

The consumer credit industry has played a significant role in electronic and other commerce. Millions of Americans use traditional bank-sponsored credit cards, private merchant sponsored cards, debit cards, stored value cards, combinations of those instruments and other accounts for retail, Internet and other purposes. Credit cards in particular offer conveniences and advantages, successfully attracting consumers who wish to simplify their shopping experience by leaving their cash and checkbooks behind. Rewards programs also enhance credit card usage.

Despite the convenience of credit cards, many individuals may prefer to avoid using them. For example, some individuals may be reluctant to use credit cards because they are averse to outstanding account balances, and wish to avoid interest charges on their purchases. Other consumers may prefer to avoid the temptation of purchasing power in excess of their immediate ability to pay. Yet other consumers may desire credit access, but are denied that access due to past credit history.

For these and other reasons, cash accounts such as bank debit cards have emerged to service consumer needs. A debit card is a card that may be linked to a consumer's cash account, such as a demand deposit account (DDA), typically a checking account. When the consumer wishes to make a purchase from a merchant, the debit card is swiped at the point of sale as a credit card would be, except the funds used to pay the merchant are deducted from the cardholders checking account rather than paid from a third party credit network. The need to carry a checkbook is eliminated, while concerns regarding credit cards are avoided.

There are, however, disadvantages to debit cards as a payment instrument. First, not all banks offer debit cards. This forces potential debit card users to open accounts elsewhere if their banks do not offer this service. Second, a consumer may not have time to keep track of precise balances on their cash account, so that the cash balance on the debit card or other instrument may be used up unknowingly.

Thus, some debit cards offer overdraft protection in the form of a secondary line of credit. A checking account accessible with a debit card, for example, may be backed by a credit line for use in the event that there are insufficient funds in the checking account to cover a purchase.

Once a person has exceeded their available cash balance and invoked the credit line, they can continue to make purchases until they have maxed out this secondary credit line. This may occur without the consumer becoming aware of that status until the limit is reached, when repayment may be more difficult.

Further, in some instances, debit card users may not be offered the same type of rewards that credit card users are eligible for.

A need therefore exists for a versatile financial instrument that permits consumers to make purchases with the funds being drawn from a desired demand deposit account held at any financial institution.

Additionally, a need exists for consumers to have a more controlled access to an overdraft credit line.

A need also exists for an instrument that will attract reluctant consumers by offering them the ability to make purchases by drawing funds from a demand deposit account, while earning points or credits toward various rewards. Other problems exist.

SUMMARY OF THE INVENTION

The invention solving these and other problems relates to a system and method for a linked account having a sweep feature, enabling individuals to purchase goods and services from a merchant using a cash account backed by a credit account, but with overdrafts being reconciled automatically on a daily or other basis.

According to one embodiment of the invention, a user may receive a linked account instrument that is linked to a cash account, such as a demand deposit account (DDA) already held by the user. The consumer may be assigned a predetermined cumulative limit or maximum daily "open to buy" amount that limits the dollar amount of goods and services that may be purchased against that account, which limit may be independent of the actual cash balance in the account. Purchases can be made by swiping the instrument (for example, an encoded card) at a merchant point of sale (P.O.S.) terminal or other site. The merchant may receive an instantaneous authorization decision from an authorization server via a processing network.

At a predetermined time each day, transactions made using the linked account card may first be processed against the user's designated cash account. The cash account may be examined to determine whether there are sufficient funds to satisfy the charges incurred by the cardholder that day.

If sufficient funds are found in the cash account, the aggregate transaction amount may be withdrawn from that account and deducted against the sweep card's daily "open to buy" amount.

If the cash account does not have sufficient funds to cover the aggregate transaction amount, the cardholder's ability to make additional purchases may be suspended. In this case, any transactions causing the aggregate transaction amount to exceed the cash account balance may be processed as a credit charge against a linked credit account, in overdraft fashion.

After the placing of the overdraft on the credit account, a check or sweep may be automatically made against the cash account at 12:01 a.m. the next day or other later time to check for sufficient funds to cover the extended overdraft credit. If sufficient cash account funds are present at the time of a subsequent sweep, the funds may be withdrawn from the cash account and the charge on the credit account may be cleared. The cardholder may be charged a fee for the use of the credit account.

If the first sweep of the cash account does not find sufficient funds to satisfy the outstanding overdraft amount on the credit account, the linked account card privileges may remain suspended and interest charges may accrue on the outstanding credit card balance until satisfaction is made.

One advantage of the invention is the ability of a cardholder to set up a cash account of their choice to make purchases, and have the funds withdrawn from one or more of demand deposit or other accounts, regardless of the institution holding the account. This allows consumers to benefit from card purchases even if their bank does not offer traditional debit-card services.

Another advantage of the invention is the flexibility of the collateral credit account. The consumer may use an existing credit account, open a credit account with the institution issuing the linked account card, or set up another type of account to supply the overdraft protection.

Yet another advantage of the invention is the ability to perform a series of automatic sweeps of the cash account in search of adequate funds. If adequate funds become available during one of the subsequent sweeps, they may be withdrawn from the cash account and the credit account may be cleared at the earliest possible opportunity. This provides advantages over a traditional debit card account, where a cardholder may have to pay off the overdraft by visiting the bank or mailing a check to the bank.

Conversely, regardless of the constituent accounts, the institution issuing the linked account card is presented with several options for handling necessary overdrafts. Based on past credit history, for example, a cardholder may be given the privilege of continuing to draw from the available line of credit without having the card privileges suspended. If a cardholder's credit history does not indicate such a feature, or if the consumer declines such a feature, the issuing institution may constrain the cardholder by suspending card privileges if a predetermined number of sweeps do not find adequate funds in the cash account.

Additional features and advantages of the invention will be apparent from the description that follows, or may be learned by practice of the invention.

BRIEF DESCRIPTION OF THE DRAWINGS

The invention will be described with respect to the accompanying drawings, in which like elements are referenced with like numbers.

DETAILED DESCRIPTION OF PREFERRED EMBODIMENTS

Figure 1:
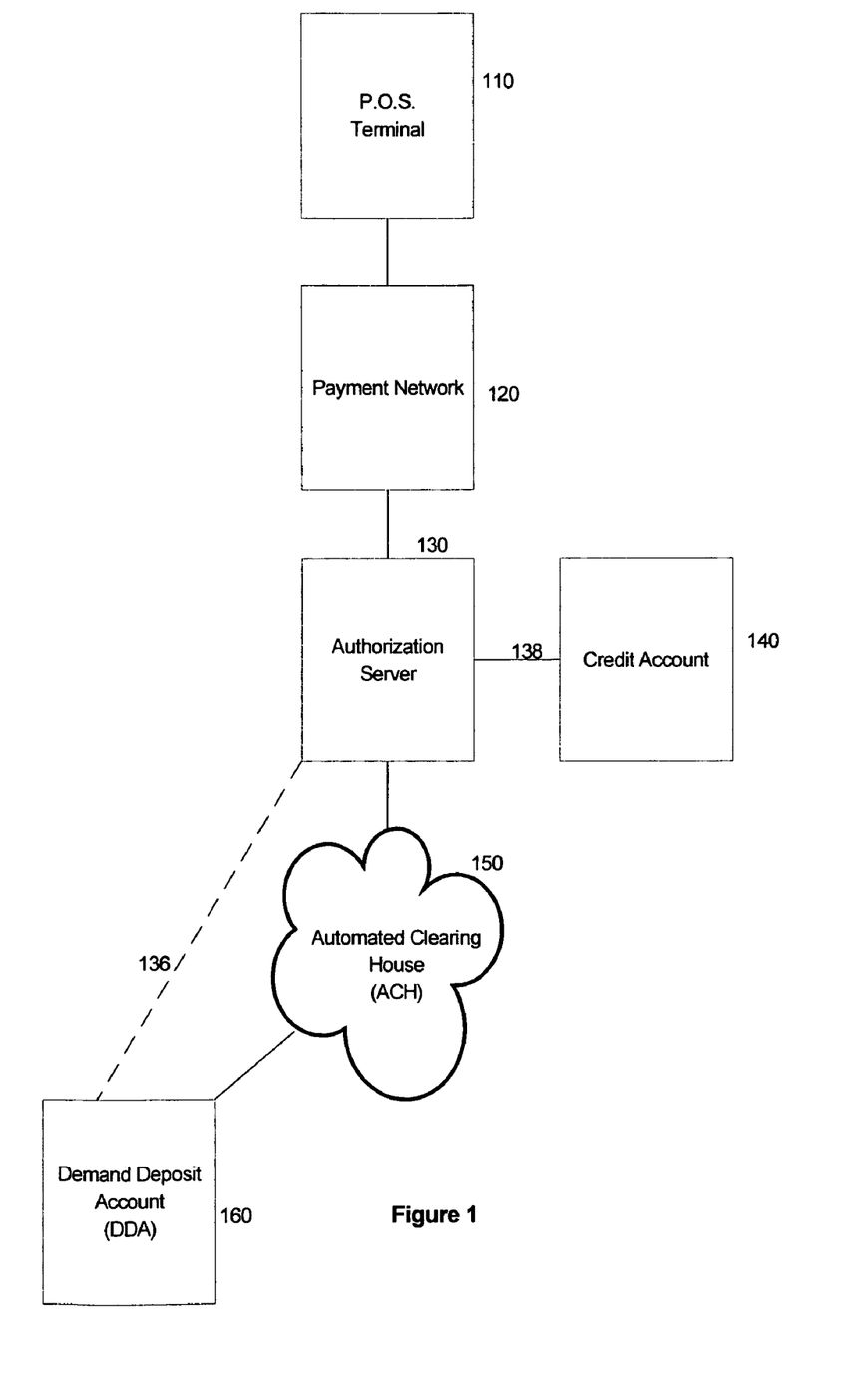
FIG. 1 is a schematic diagram of a system supporting a linked account card according to an embodiment of the invention.

FIG. 1 illustrates a schematic overview of various components of a transaction architecture supporting the use of a linked account according to the invention. A linked account instrument (not shown, for instance a magnetically encoded plastic card similar to a credit card or ATM card) may be provided to consumers to access funds in an existing cash account 160 such as a DDA held at a financial institution, such as a bank or savings and loan, or other institution.

Transactions may be initiated by swiping the linked account card at a point of sale (P.O.S.) terminal 110 when purchasing goods and/or services from merchants, or via other mechanisms such as telephone or Internet remote authorizations against the linked account card.

The merchant seeks authorization for each transaction from an authorization server 130 through a processing network 120, such as through the VISA™, MASTERCARD™ or other network which may adapted for transaction processing against a debit card or other cash account.

The authorization server 130 may be maintained by the institution that issues the linked account card and may include an account information database, an account balance database, and/or a transaction history database and other components. The authorization server 130 may be provided with a first interface 136 to the cash account 160, and a second interface 138 to the credit account 140. Transactions made using the linked account card may be first processed against the cash account 160 designated by the cardholder, via an automated clearing house (ACH) 150. If the cash account 160 does not contain adequate funds and the authorization is rejected, the authorization server may temporarily suspend use of the card and process the transactions as a credit charge against a credit account 140. This credit account may also be designated by the cardholder, and act as an overdraft account protecting the cash account 160.

One or more sweeps against the cash account may be automatically performed at a later time to check for sufficient funds to satisfy the overdraft amount charged to the credit account 140. If sufficient funds are present in the cash account 160 at the time of a subsequent sweep, the funds may be to withdrawn and applied to the credit account 140 to clear that account. The consumer may incur a fee for the use of the credit account 140. If subsequent sweeps of the cash account do not find sufficient funds, the linked account card privileges may remain suspended and the cardholder faces accumulating interest charges on the outstanding credit card balance.

The account transaction system according to the invention in one regard will be described in additional detail below.

Setting up the Account

Figure 2:
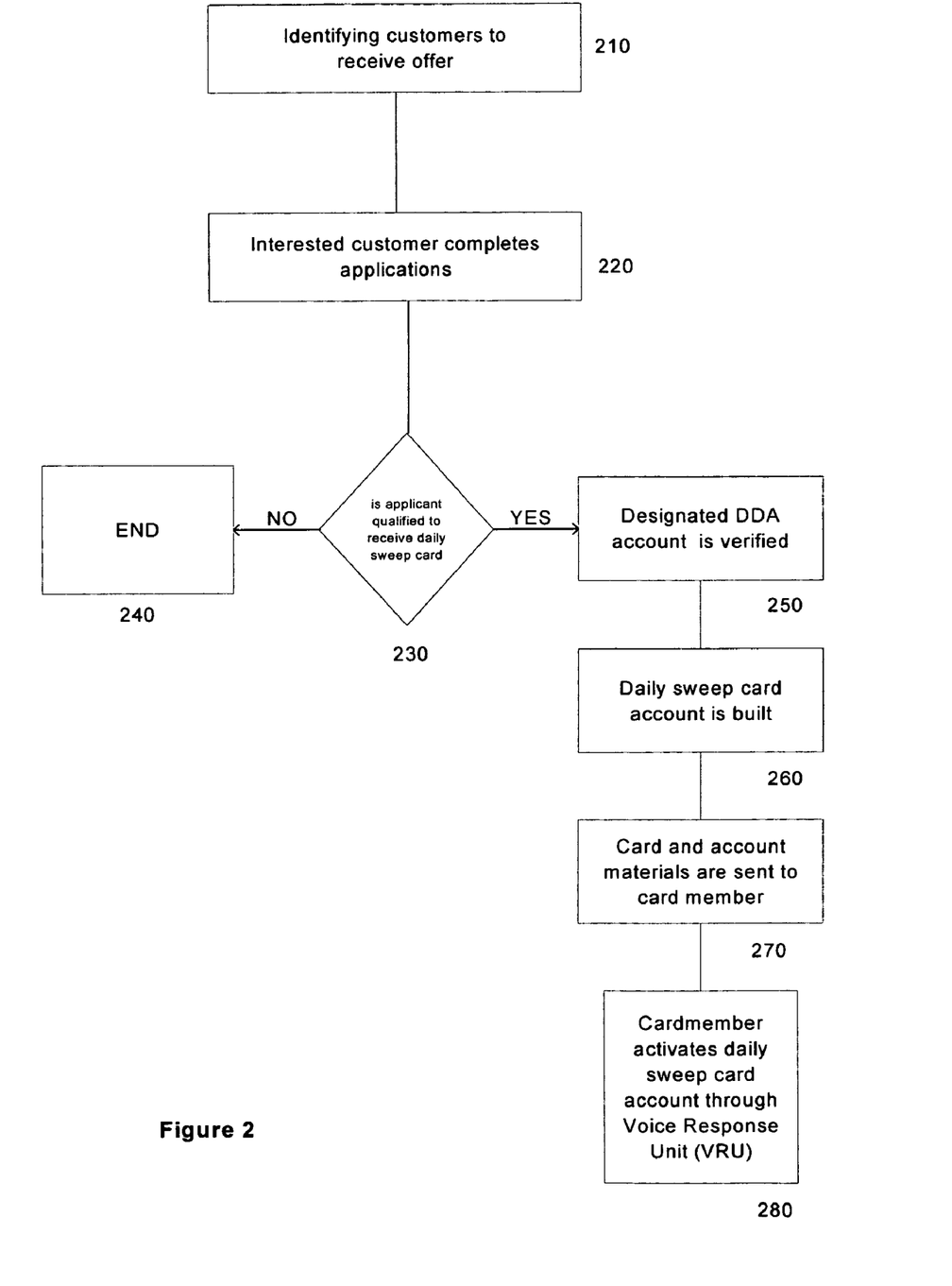
FIG. 2 is a flowchart which illustrates the establishment of a linked account card account according to an embodiment of the invention.

FIG. 2 illustrates steps that may be followed when establishing a linked account card account according to one embodiment of the invention. Potential linked account cardholders may be identified through known marketing solicitation techniques, illustrated at step 210. These potential cardholders, or applicants, may be required to complete an application in step 220 requesting information pertaining to their financial history.

In step 230, the potential cardholder's application may then processed by the institution that issues the linked account card. This results in a determination of the applicant's eligibility to receive a linked account card. Credit decisioning may be handled through known services, such as the Magnum™ engine or the like. If a negative decision is made, in step 240 the applicant may be denied a linked account card. If the applicant is approved, at least two additional pieces of information may be required.

First, as illustrated in step 250, a potential cardholder may be asked to designate a demand deposit account (DDA) or other backing account that will provide the cash funds for purchases made with the linked account card. The designated cash account may be a checking account, a savings account or other account held at a bank or other institution. In an alternative embodiment discussed below, more than one cash account may be selected to provide the cash or cash equivalent for transaction processing.

A second item that a potential cardholder may be required to provide in step 250 is a designated credit or other account to handle overdrafts. This may be an existing credit card or other account. If the linked account cardholder does not already have an existing credit account, one may be established through the institution that is issuing the linked account card. Once these accounts have been identified, they may be verified before the linked account card account is established in step 260.

Finally, in step 270 the linked account card itself may be mailed to the new cardholder along with the materials explaining the nature of the account. Upon receiving these materials, the cardholder may call a voice response unit (VRU) or other facility to activate the card, as illustrated in step 280.

The linked account card provided to the cardholder may bear a VISA™, MASTERCARD™ or other acceptance mark. The linked account card may have a daily spending limit, which may be referred to as an "open to buy" amount. This means that, on any given day, the cardholder will only be able to purchase goods and services up to that dollar amount, regardless of the cardholder's cash balance.

This daily spending limit or "open to buy" amount may be determined by the credit history information received during processing of the cardholder's application or otherwise. The daily spending limit may also be monitored on a daily basis by the authorization server 130 maintained by the card-issuing institution.

Authorizing Transactions

Figure 3:
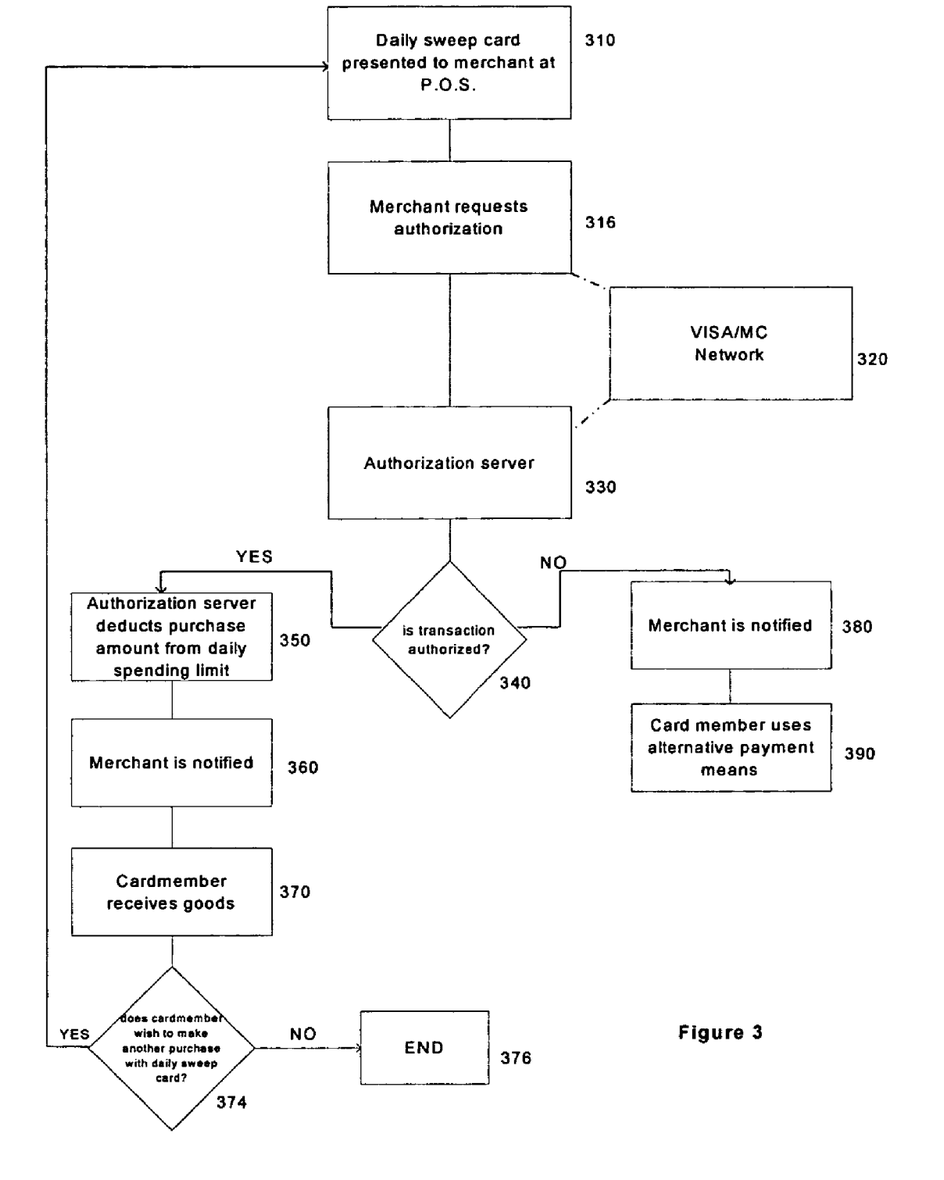
FIG. 3 is a flowchart which illustrates a process of authorizing transactions made with a linked account card according to an embodiment of the invention.

FIG. 3 illustrates a process of authorizing purchases that the cardholder wishes to make using the linked account card according to an embodiment of the invention.

In step 310, the cardholder may present the linked account card to the merchant. In step 316, the merchant may request authorization from an authorization server through a processing network, such as the VISA™, MASTERCARD™, or other network. The authorization server 130 determines in step 340 whether the transaction may authorized. This determination may depend in part on whether the cardholder's daily cumulative spending limit or "open to buy" amount has been reached.

If it has, the authorization server 130 may not authorize the transaction. If the daily spending limit has not been reached, the authorization server 130 may authorize the transaction. The authorization server 130 may also process authorizations against this "open to buy" amount using business rules established by the institution issuing the linked account card, along with other financial rules.

If the transaction is not authorized, in step 380 the merchant may be notified and the cardholder may abandon the purchase or select another form of payment, as illustrated in step 390.

If the transaction is authorized, in step 350 the authorization server 130 may keep a record of what amount of the daily spending limit has been used by the purchase. In step 360, the merchant may be notified that the transaction has been authorized, allowing the cardholder to receive the goods or services purchased in step 370.

If the cardholder wishes to make another purchase using the linked account card, the process may be re-entered at step 310. Otherwise, the process flow illustrated in FIG. 3 may end at step 376.

Settling Transactions

Figure 4A:
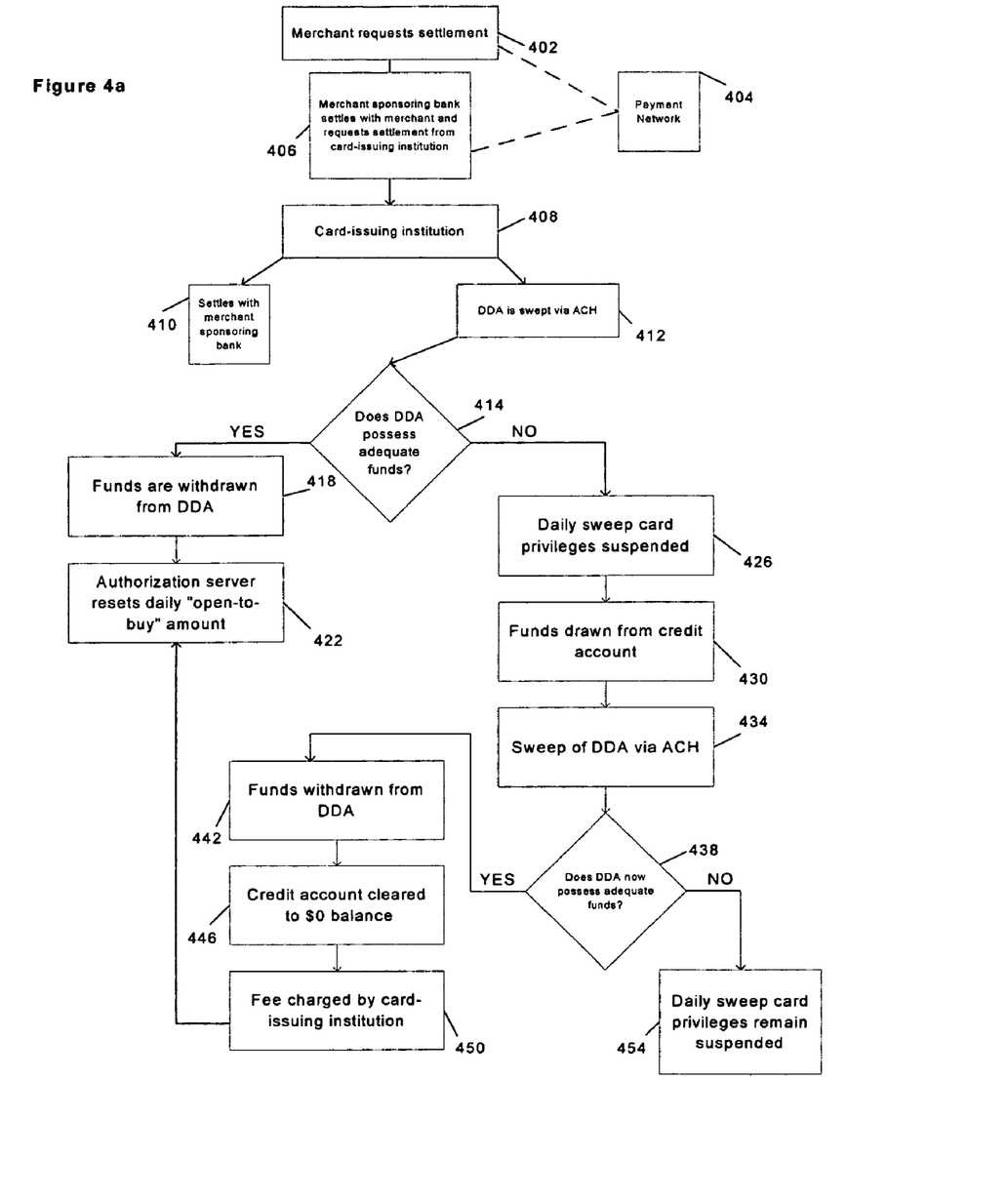
FIG. 4a is a flowchart illustrating the settlement of transactions initiated through use of a linked account card, according to an embodiment of the invention.

Subsequent to the completion of an authorized transaction, the merchant may issue a settlement request, as illustrated by step 402 in FIG. 4a. Such a request may be sent to the merchant's sponsoring bank or financial institution, through a processing network 404, such as the VISA™, MASTERCARD™, or other network which may be adapted for transaction processing against a debit card or other cash account. At step 406, the merchant's sponsoring bank or financial institution may pay the merchant, while simultaneously sending a request for payment to the institution 408 that issued the linked account card. As illustrated in step 410, the card-issuing institution 408 may then settle with the merchant's sponsoring bank or financial institution through an automated clearing house (ACH), as appreciated by persons skilled in the art.

Aside from settlement with the merchant's sponsoring bank, the card-issuing institution 408 has to settle with the cardholder. For each transaction initiated with the linked account card, individual automated clearing house debits may be generated which contain the unique merchant identification in the descriptor field such that the merchant identification appears on the cardholder's cash account statement.

At a predetermined time, such as at, near or just after the end of each day, the cardholder's designated cash account may be swept via an automated clearing house to determine whether adequate funds exist to cover all of the day's charges accumulated through use of the linked account card. This is illustrated in step 412. At step 414, an inquiry may be made to determine whether the designated cash account has sufficient funds to cover all of the individual debits that were generated by the authorization server 130 in response to the charges accumulated using the linked account card.

If adequate funds are present in the cardholder's designated cash account 160 at the time of reconciliation, the funds may be withdrawn from the cash account 160 in step 418 and the authorization server 130 may reset the daily spending limit to its full amount in step 422 for the following day.

If the designated cash account 160 does not have sufficient funds to cover the purchases at the time of the sweep, the authorization server 130 may draw the funds from the available credit on the credit account 140 that was designated by the cardholder as illustrated in step 426.

At this point, the authorization server 130 may be configured to JO temporarily suspend the cardholder's ability to make further purchases with the linked account card, in step 430. Step 430 will occur regardless of whether the daily spending limit or "open to buy" amount has been reached.

It may be noted that there are different variations possible when determining how the accumulated daily transactions will be added up and applied against the designated cash account 160.

In one embodiment, a FIFO (first-in, first-out) system may be used, wherein the daily charges will be applied against the cash account 160 in the order in which they were made. As soon as a debit is found that cannot be drawn from the cash account 160 due to insufficient funds, the credit account 140 may be applied to cover that particular charge, as well as any remaining charges up to a credit limit of that account.

Additionally, in another embodiment the sequence of daily charges may be applied against the cash account 160 based on the relative size of the transaction amount. For example, all of the smaller charges may be drawn against the cash account 160 first, leaving only the remaining larger charges that cannot be satisfied to be covered via the credit account 140. Conversely, the larger purchases may be drawn against the cash account 160 first, leaving only the smaller charges to be covered by the credit account 140 when funds in the cash account 160 become insufficient.

Another embodiment may be employed when the cash account 160 can only handle a percentage of a particular charge. For example, assume that charges are being applied against the cash account 160 during a sweep. If the cash account 160 reaches a point at which it can only cover a certain percentage of a charge being applied against it, the system may be configured to have the cash account 160 cover whatever percentage of the charge it can, only sending the shortfall to the credit account 140. Or, the system may be configured to have the entire charge be covered by the credit account 140.

According to the invention, and as seen in step 434, the cash account 160 may be swept again at a later time, such as 12:01 am on the next day, to determine whether or not the cash account 160 now contains sufficient funds as reflected in updated ACH activity.

This sweep may be performed in order to catch deposits that may have been made to the cash account 160 during the same day as the transaction activity, but not credited to the cash account 160 until the following business day. For example, the cardholder may have realized that a purchase was made with the card that could not be covered by the funds in the cash account 160. The cardholder may have rushed to deposit funds into the cash account 160 in order to ensure that the purchase would be covered, only to have the deposited funds be credited to the cash account 160 after the initial authorization attempt.

At step 438, another inquiry may be made to determine whether the cash account 160 contains adequate funds.

If there are now adequate funds in the cash account 160, the funds will be drawn from the cash account 160 in step 442, and the overdraft amount that was initially drawn against the credit account 140 may be cleared from the credit account 140 in step 446. The cardholder may incur a fee for the temporary use of the credit account in step 450, and the linked account card may be reactivated with the daily spending limit be replenished in step 422.

In the event that there are still inadequate funds in the cash account 160 when the second sweep is performed, the linked account card account may remain suspended in step 454 until such time as the overdraft amount charged to the credit account 140 is paid off and there is a positive balance. The cardholder may then be subject to a fee, as well as any accumulating interest charges on the credit account. Again, this is unlike a typical debit card, where once a cardholder is forced to use the overdraft credit line, they may continue to do so until their line of overdraft credit is maxed out. In other words, conventional debit cards do not have the added safety feature of suspending the account and disallowing the user to accumulate more debt.

According to the invention, the cardholder may have access to their transaction history and daily spending limit information, via an interactive voice response (IVR) unit. This information may also be accessible through a web-site hosted by the card-issuing institution. Again, charges processed against the cardholder's cash account 160 may appear on the cardholder's monthly cash account statement as well.

In an alternative embodiment of the invention, two or more sweeps of the cash account may occur before requiring payment of the credit advanced in order to restore card privileges. In other words, the number of subsequent sweeps of the cash account 160 can be varied by the institution issuing the card.

Figure 4B:
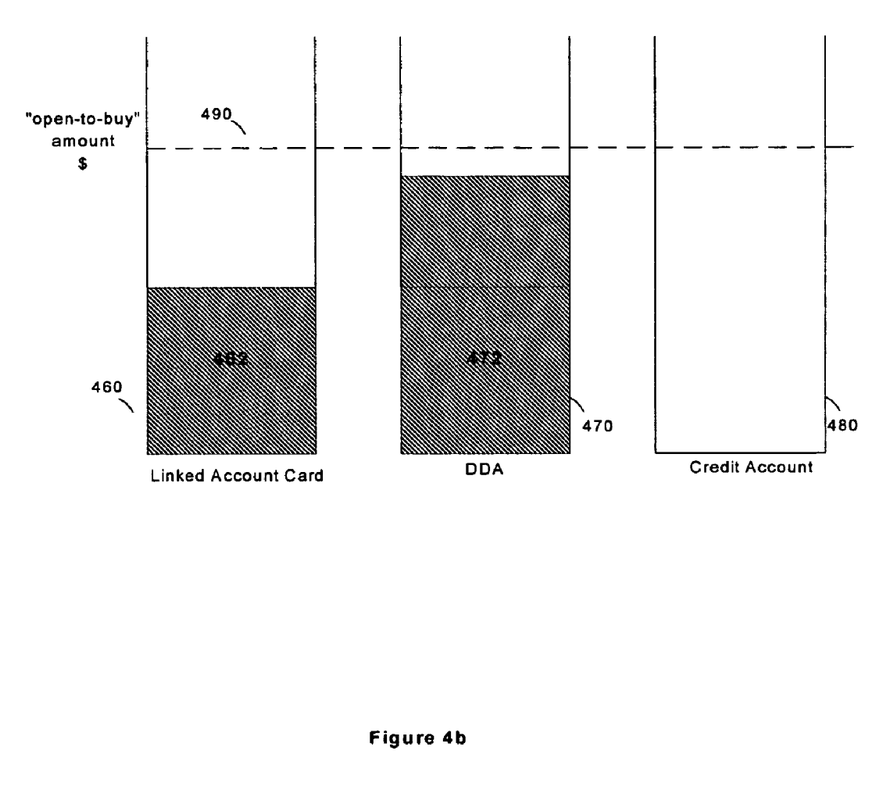
FIG. 4b is a graphical representation of one example of the settlement of transactions initiated through use of a linked account card, according to an embodiment of the invention.
Figure 4C:
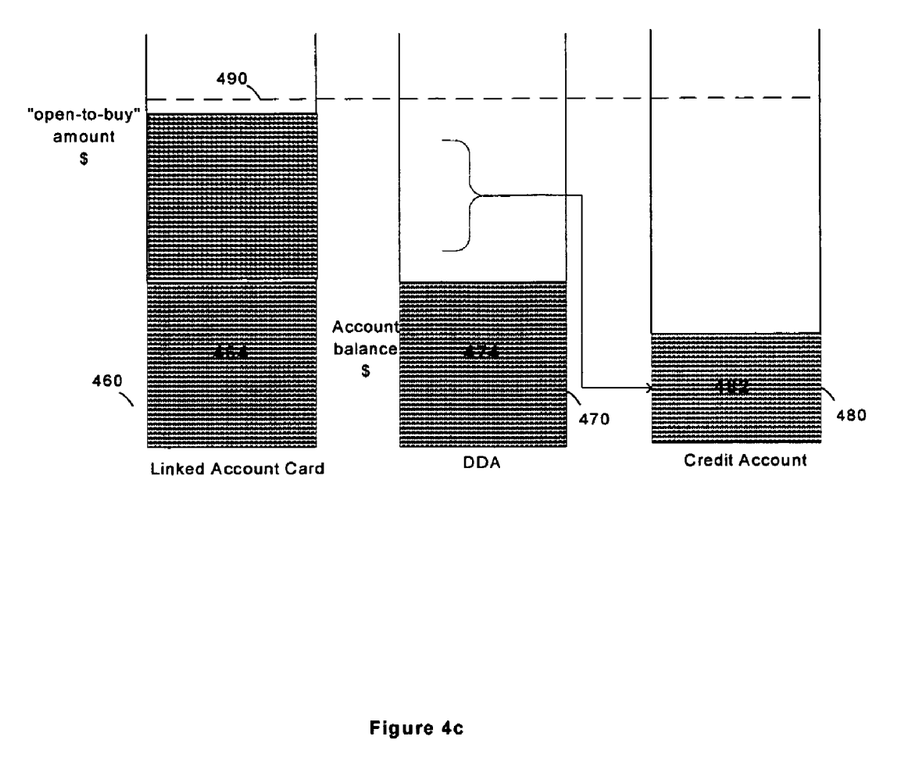
FIG. 4c is a graphical representation of one example of the settlement of transactions initiated through use of a linked account card, according to an embodiment of the invention.

FIGS. 4b and 4c illustrate settlement transactions initiated through use of a linked account card, according to an embodiment of the invention. FIG. 4b illustrates an instance in which the linked account card 460 has been used to purchase goods and services which total a dollar amount 462 that is less than the card's "open to buy" amount 490. When the predetermined time (which may be near the end of the day) arrives for the sweep of the designated cash account 470, it is seen that the cash account 470 has an adequate balance 472 to cover the cost of the day's purchases. Accordingly, the funds can be withdrawn from the cash account 470, and no overdraft action against the credit account 480 is needed.

FIG. 4c illustrates an example in which a cardholder has maxed out the "open to buy" amount 490 of the linked account card 460, by purchasing goods and services in a graphically illustrated dollar amount 464 that exceeds the "open to buy" amount 490. In this example, when the predetermined time arrives for the sweep of the designated cash account 470, it is discovered that the balance 474 of the cash account is inadequate to cover the aggregate of the day's purchases. At this point, the funds 482 that cannot be drawn from the designated cash account (the overdraft amount) may be drawn from the credit account 480. Additionally, the authorization server may temporarily suspend the cardholder's ability to make further purchases with the linked account card.

It may be noted that there may be an instance in which the cardholder, on one day, reaches the maximum "open to buy" amount of the card, while having a zero balance in the designated cash account to cover the purchases. For this reason, the credit account may preferably have a credit line equivalent to the "open to buy" amount of the linked account card.

In an alternative embodiment of the invention, the institution issuing the linked account card may choose to allow a cardholder to continue to use the linked account card once the cash account 160 is found to have insufficient funds. The cardholder may be given the option of continuing to draw from the remaining credit line available on the collateral card. This may be a desirable option for individuals who desire a traditional debit card, however are unable to have one because their bank does not offer the service.

In another alternative embodiment of the invention, the linked account card may be linked to multiple cash accounts designated by the cardholder in order to allow each to be swept in search of sufficient funds before the credit account 140 is needed.

Figure 5:
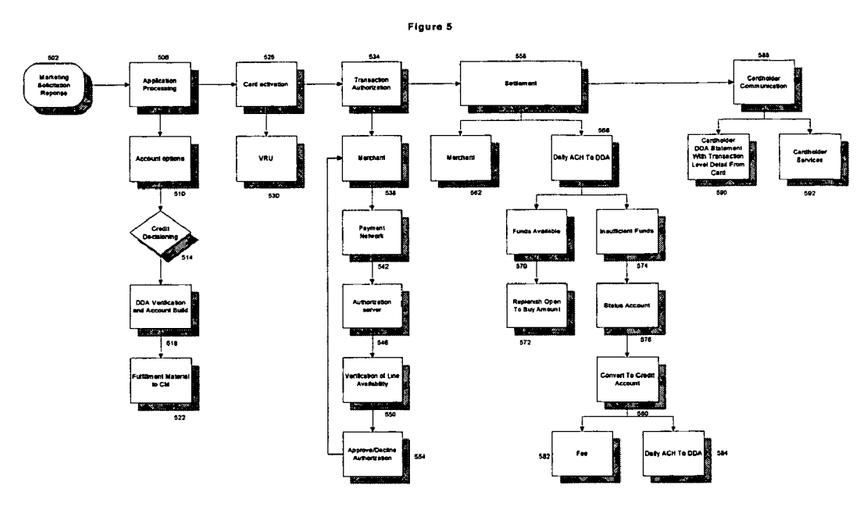
FIG. 5 is a flowchart illustrating overall processing according to the invention, in another regard.

FIG. 5 illustrates overall processing according to the invention, in another regard.

In step 502, marketing solicitation is performed in order to identify potential linked account cardholders. Interested applicants may be required to complete an application detailing certain information pertaining to their financial history. Processing the application, as illustrated in step 506, may comprise the steps of identifying account options most suited for each particular applicant (step 510), and making a decision regarding the applicant's ability to satisfy the particular requirements of these options (step 514). If it is determined that the applicant is approved, they will be required to specify a demand deposit account or other backing account that will provide the funds for purchases made with the linked account card. In step 518, the designated cash account may be verified and the cardholder's linked account card account may be created.

Upon furnishing the linked account card and the account materials to the new cardholder (step 522), the cardholder may activate the card by calling a voice response unit (VRU), as seen in steps 526 and 530.

Each purchase or transaction that the cardholder wishes to make with the linked account card may be subject to authorization (step 534). When a cardholder desires to make a purchase, and presents the card to a merchant, the merchant may request authorization from an authorization server through a payment network. This is illustrated in steps 538, 542, and 546, respectively. In step 550, the authorization server may check to see whether or not the daily "open to buy" amount of the linked account card has been reached. The results of this check, coupled with the adherence to pertinent financial rules, can result in the determination of whether or not authorization for the transaction will be approved or denied (step 554).

Subsequent to the completion of an authorized transaction, settlement with the merchant occurs, as is illustrated in step 562. The merchant may make a settlement request which is sent to the merchant's sponsoring bank or financial institution, through a processing network. The merchant's sponsoring bank or financial institution may pay the merchant, while simultaneously sending a request for payment to the institution that issued the linked account card. Settlement between the card-issuing institution and the merchant's sponsoring bank or financial institution may occur through an automated clearing house.

Aside from settlement with the merchant's sponsoring bank, the card-issuing institution has to settle with the cardholder. In step 566, the cardholder's designated cash account may be swept to determine whether adequate funds are present to cover all of the day's charges accumulated through use of the linked account card. Note that the cash account may be swept at any pre-determinable time, which may typically be near the end of the day. If there are adequate funds available in the designated cash account (step 570), the funds may be withdrawn from the cash account and the authorization server 130 may reset the daily "open to buy" amount to its full amount in step 572 for the following day.

If the designated cash account does not have sufficient funds (step 574) to cover the charges at the time of the sweep, the status of the account may be evaluated at step 576, and the cardholder's ability to make further purchases with the linked account card may be temporarily suspended. Additionally, the authorization server 130 may draw the necessary funds from the available credit account, as illustrated in step 580. The cardholder may be charged a fee for the use of this credit account (step 582). Finally, one or more subsequent sweeps of the designated cash account may occur, as illustrated by step 584. If adequate funds are present, they will be withdrawn from the cash account, and the credit account will be cleared. Otherwise, the daily purchasing abilities afforded the cardholder through use of the linked account card may continue to be suspended until the credit account is settled.

Communication with the cardholder (step 588) may take one or more forms. Statements of linked account card activity will be sent on a regular basis to the cardholder detailing each card transaction (step 590). Additionally, the cardholder may have access to their transaction history and daily spending limit information, via additional services (step 592) such as an interactive voice response (IVR) unit. This information may also be accessible through a web-site hosted by the card-issuing institution.

Other embodiments, uses and advantages of the invention will be apparent to those skilled in the art from consideration of the specification and practice of the invention disclosed herein. The specification should be considered exemplary only, and the scope of the invention is accordingly intended to be limited only to the following claims.

What is claimed is:

1. A system for processing electronic transactions, comprising:
    a first interface to at least one cash account against which charges incurred through use of a linked account instrument are drawn;
    a second interface to at least one credit account used to back said at least one cash account in the event of insufficient funds in said at least one cash account to cover the charges incurred through the use of the linked account instrument; and
    an authorization server, communicating with the first interface and the second interface, the authorization server authorizing individual transactions against a pre-determined cumulative limit on said at least one cash account, and performing sweeps of said at least one cash account at predetermined times to determine whether said at least one cash account contains sufficient funds to cover the charges incurred through use of the linked account instrument.

2. The system of claim 1, wherein said at least one cash account comprises at least one demand deposit account.

3. The system of claim 1, wherein said at least one demand deposit account comprises a plurality of demand deposit accounts.

4. The system of claim 1, wherein said at least one cash account may be held at any financial institution.

5. The system of claim 1, wherein said at least one credit account comprises a plurality of credit accounts.

6. The system of claim 1, wherein said at least one credit account may be held at any financial institution.

7. The system of claim 6, wherein said at least one credit account has an associated credit line at least equal to the predetermined cumulative limit.

8. The system of claim 1, wherein the authorization server comprises at least one of an account information database, an account balance database, and a transaction history database.

9. The system of claim 1, wherein individual automated clearing house debits are generated for each transaction initiated with the linked account instrument.

10. The system of claim 9, wherein the automated clearing house debits are first processed against said at least one cash account via an automated clearing house.

11. The system of claim 10, wherein the automated clearing house debits are processed against said at least one cash account in the order in which they were generated.

12. The system of claim 10, wherein each automated clearing house debit is processed against said at least one cash account based on the relative size of its amount.

13. The system of claim 12, wherein the smallest debit amounts are processed against said at least one cash account first, leaving larger debits that cannot be satisfied by said at least one cash account to be processed against said at least one credit account.

14. The system of claim 12, wherein the largest debit amounts are processed against said at least one cash account first, leaving smaller debits that cannot be satisfied by said at least one cash account to be processed against said at least one credit account.

15. The system of claim 10, wherein an entire debit amount is processed against said at least one credit account in the event that there are funds in said at least one cash account that can only cover a percentage of the debit amount.

16. The system of claim 10, wherein a first percentage of the debit amount is processed against said at least one cash account, and a second percentage of the debit amount is processed against said at least one credit account in the event that there are funds in said at least one cash account that cannot satisfy the entire debit amount.

17. The system of claim 1, wherein the predetermined cumulative limit is a daily limit, and the authorization server is configured to decline to authorize additional transactions attempted with the linked account instrument once the daily limit has been reached.

18. The system of claim 17, wherein the authorization server is configured to cease authorizing transactions attempted with the linked account instrument if a first sweep of said at least one cash account finds insufficient funds to satisfy previous charges incurred through use of the linked account instrument.

19. The system of claim 18, wherein said at least one credit account used to back said at least one cash account will be cleared if a subsequent sweep of said at least one cash account finds adequate funds to satisfy those funds covered by said at least one credit account.

20. The system of claim 19, wherein the authorization server is configured to refresh the pre-determined cumulative limit and authorize transactions after said at least one credit account has been cleared.

21. The system of claim 20, wherein a user of the linked account instrument is charged a fee for use of said at least one credit account.

22. The system of claim 18, wherein the authorization server is configured to continue to cease authorizing transactions attempted with the linked account instrument if a pre-determined number of subsequent sweeps of said at least one cash account fail to find sufficient funds to satisfy the charges incurred through use of the linked account instrument.

23. The system of claim 17, wherein the authorization server is configured to continue to authorize linked account card transactions up to the predetermined cumulative limit against available credit on the credit account, even if a first sweep of the cash account finds insufficient funds to satisfy previous charges.

24. The system of claim 1, wherein said authorization server is further configured to automatically withdraw funds from said at least one cash account to cover at least part of the charges incurred through use of the linked account instrument.

25. A system for processing electronic transactions, comprising:

a first interface to at least one cash account against which charges incurred through use of a linked account instrument are drawn;

a second interface to at least one credit account used to back said at least one cash account in the event of insufficient funds in said at least one cash account to cover the charges incurred through the use of the linked account instrument; and an authorization server, communicating with the first interface and the second interface, the authorization server authorizing individual transactions against a pre-determined cumulative limit on said at least one cash account, performing sweeps wherein funds are withdrawn from said at least one cash account at predetermined times, and, if funds are not available from said at least one cash account, using the at least one credit account until the at least one cash account contains sufficient funds to cover the charges incurred through use of the linked account instrument.

* * * * *